(12) United States Patent
Hong

(10) Patent No.: US 6,423,449 B1
(45) Date of Patent: Jul. 23, 2002

(54) LITHIUM SECONDARY CELL AND METHOD OF FABRICATING THE SAME

(75) Inventor: Ji Jun Hong, Chungcheongnam-Do (KR)

(73) Assignee: Kokam Engineering Co., Ltd., Chungcheongnam-Do (KR)

(*) Notice: Subject to any disclaimer, the term of this patent is extended or adjusted under 35 U.S.C. 154(b) by 0 days.

(21) Appl. No.: 09/518,277

(22) Filed: Mar. 3, 2000

(30) Foreign Application Priority Data

Dec. 20, 1999 (KR) .......................................... 99-59182

(51) Int. Cl.$^7$ ............................................ H01M 10/14
(52) U.S. Cl. ................................ 429/231.95; 429/129
(58) Field of Search ........................... 429/231.95, 137, 429/129, 139, 142

(56) References Cited

U.S. PATENT DOCUMENTS

| | | | |
|---|---|---|---|
| 5,498,489 A | | 3/1996 | Dasgupta et al. |
| 5,667,909 A | * | 9/1997 | Rodriguez et al. ........... 429/127 |
| 5,989,741 A | | 11/1999 | Bloomfield et al. |
| 6,136,471 A | * | 10/2000 | Yoshida et al. ........... 429/218.1 |

FOREIGN PATENT DOCUMENTS

| DE | 19540845 A1 | 5/1996 |
|---|---|---|
| EP | 0602976 A1 | 12/1993 |
| EP | 0682376 A1 | 5/1995 |

OTHER PUBLICATIONS

B.K. Petrin, *Chemical Sources of Electrical Current with a High Energy Capacity*, Moscow, Viniti, pp. 76, 77 (1986).

* cited by examiner

*Primary Examiner*—Gabrielle Brouillette
*Assistant Examiner*—M. Wills
(74) *Attorney, Agent, or Firm*—Fredrickson & Byron, P.A.

(57) ABSTRACT

The present invention relates to a lithium secondary cell and a method of fabricating the same. The lithium secondary cell; a plurality of cathode plates having a desired size and adhered on one surface of the separator film while being uniformly spaced apart from one another; a plurality of anode plates having a desired size and adhered on the other surface of the separator film at spaced positions corresponding to the cathode plates; and the separator film attached with the anode plates and the cathode plates being repeatedly folded such that the anode plates and the cathode plates are arranged in an alternating fashion. Thus, the lithium secondary cell has improved performance and particularly safety by preventing a firing caused by high current and excessive voltage charged, while having various shapes and sizes, and a desired capacity and achieving a simplified fabrication.

9 Claims, 7 Drawing Sheets

LITHIUM SECONDARY CELL AND METHOD OF FABRICATING THE SAME

BACKGROUND OF THE INVENTION

1. Field of the Invention

The present invention relates to a lithium secondary cell having a configuration in which anode plates and cathode plates are arranged in an alternating fashion, thereby allowing the lithium secondary cell to have improved performance and stability, various shapes and sizes, and a desired capacity while achieving a simplified fabrication. The present invention also relates to a method of fabricating the lithium secondary cell.

2. Description of the Prior Art

With recent development in telecommunication and portable phone industries, a more compact, lighter, portable, and high performance-lithium secondary cell is of need.

In general, the lithium secondary cell has a triple-layer structure of cathode/separator film/anode, or a five layer structure of cathode/separator film/anode/separator film/cathode. Conventional methods of fabricating the lithium secondary cell of a reasonable capacity include a laminating method and a winding method.

Figure 1A:
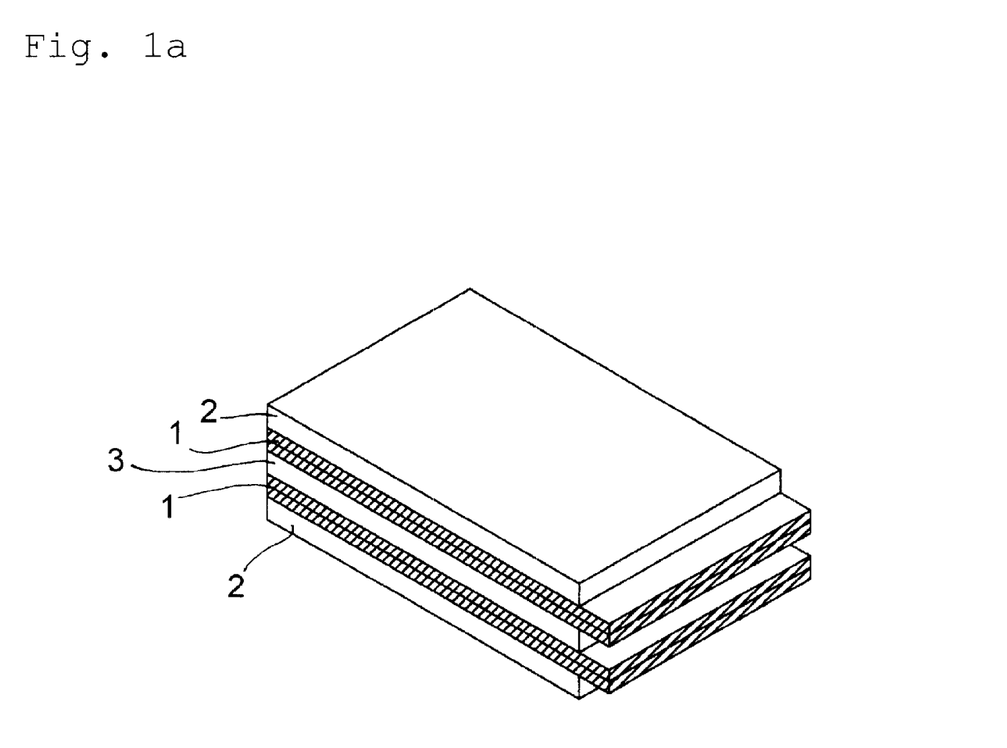
FIG. 1a is a perspective view showing a structure of a lithium secondary cell fabricated in accordance with a conventional laminating method.
Figure 1B:
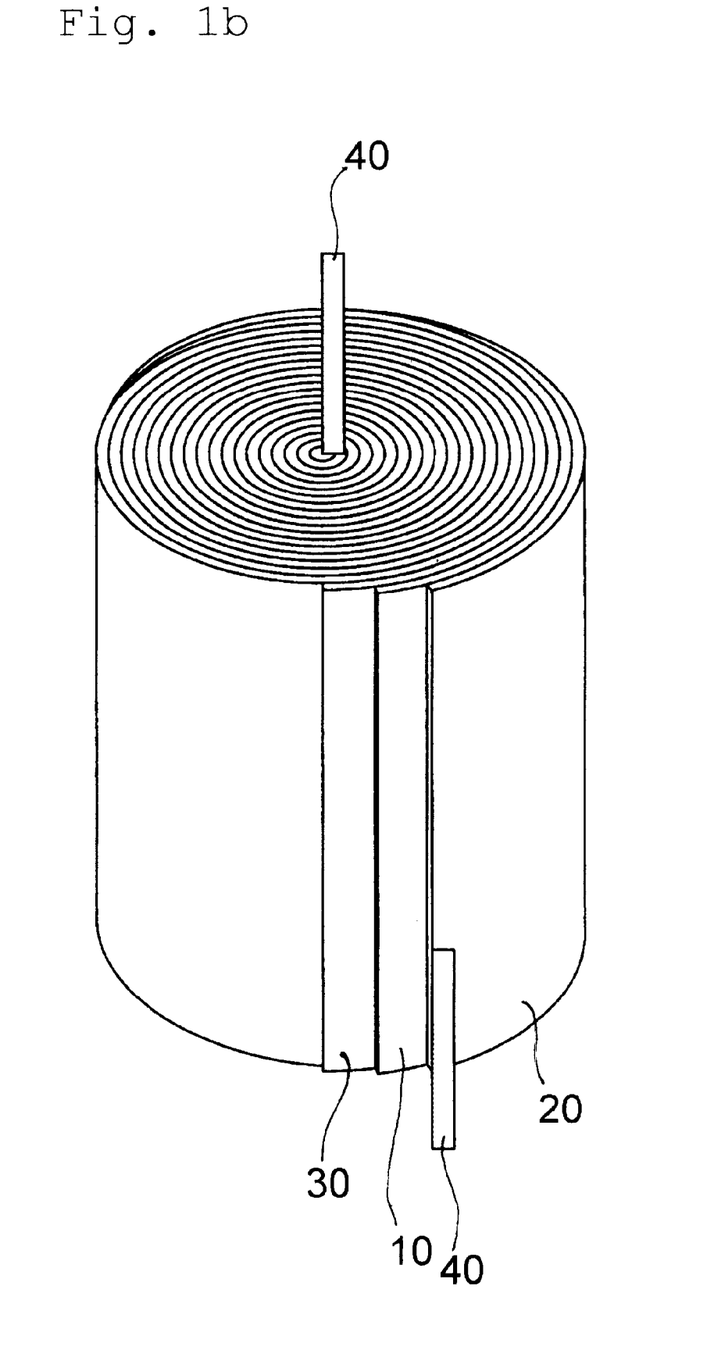
FIG. 1b is a perspective view showing a structure of a lithium secondary cell fabricated in accordance with a conventional winding method.

Structures of lithium secondary cells fabricated in accordance with conventional methods are shown in FIGS. 1a and 1b. FIG. 1a is a perspective view showing a lithium secondary cell having a unit cell of a structure consisting of cathode 2/separator film 1/anode 3. Such a secondary cell comprises a plurality of unit cells, each having the electrode plates 2 and 3 heat-adhered on the separator film 1. A plurality of the unit cells are laminated and connected to each other in parallel depending on a desired capacity of the lithium secondary cell.

However, in the lithium secondary cell shown in FIG. 1a, the cathode plate, the separator film, and the anode plate, are heat-adhered (laminated) to each other. Thus, when the lithium secondary cell is continuously excessively charged, due to the wrong use of the cell by user or the control indisposition of a charger, it is continuously increased in voltage such that it is likely to be fired. Further, a process for heat-adhering the cathode plate and the anode plate onto the separator film, and a process for laminating the unit cells to each other, are complex. This results in a decrease in a cell fabrication.

FIG. 1b is a perspective view showing a lithium secondary cell fabricated in accordance with the conventional winding method. Such a lithium secondary cell is fabricated by winding, on a central core, a unit cell having a structure of a cathode 20/separator film 10/anode 30 and having a length meeting a desired capacity of the cell.

As the lithium secondary cell fabricated according to the winding method has a cylindrical shape, it is relatively heavy in weight and relatively large in size. Moreover, positions, at which electrode tabs 40 can be attached, are limited to an electrode at a concentric circle axis of the cylinder, and another electrode at the winding end.

SUMMARY OF THE INVENTION

It is therefore an object of the present invention to solve the above mentioned problems, and to provide a lithium secondary cell having improved performance and particularly safety by preventing a firing caused by high current and excessive voltage charged, while having various shapes and sizes, and a desired capacity and achieving a simplified fabrication.

Also, another object of the present invention is to provide a method of fabricating the lithium secondary cell.

In accordance with an aspect of the present invention, there is provided a lithium secondary cell comprising: a separator film; a plurality of cathode plates having a desired size and adhered on one surface of the separator film while being uniformly spaced apart from one another; a plurality of anode plates having a desired size and adhered on the other surface of the separator film at spaced positions corresponding to the cathode plates; and the separator film attached with the anode plates and the cathode plates being repeatedly folded such that the anode plates and the cathode plates are arranged in an alternating fashion.

In accordance with another aspect of the present invention, there is provided a method of fabricating a lithium secondary cell, comprising the steps of: applying an adhesive on a separator film; adhering a plurality of cathode plates having a desired size on a surface of the separator film in such a fashion that they are uniformly spaced apart from one another; adhering a plurality of anode plates having a desired size on the other surface of the separator film in such a fashion that they are spaced apart from one another; and repeatedly folding the separator film attached with the anode plates and the cathode plates such that the anode plates and the cathode plates are arranged in an alternating fashion.

BRIEF DESCRIPTION OF THE DRAWINGS

The above, and other objects and aspects of the invention will be apparent from the following description of embodiments with reference to the accompanying drawings, in which.

DETAILED DESCRIPTION OF THE PREFERRED EMBODIMENTS

A lithium secondary cell in accordance with an embodiment of the present invention will now be described with reference to FIGS. 2 and 3.

Figure 2:
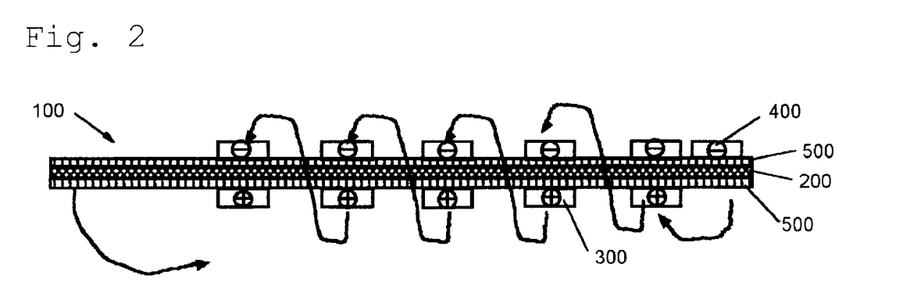
FIG. 2 is a cross-sectional view showing a structure of a lithium secondary cell in accordance with an embodiment of the present invention.

As shown in FIG. 2, a crude lithium secondary cell, before folding, consists of a triple-layer structure of cathode plates 300/separator film 200/anode plates 400. The cathode plates 300 are fabricated by applying a cathode activator on a foil made of a metal, such as aluminum, and then drying the resulting foil. Such cathode plates are cut to have a desired size and adhered on one surface of the separator film 200. The anode plates 400 are fabricated by applying an anode activator on a foil made of a metal, such as copper, and then drying the resulting foil. Such anode plates are cut to have a desired size and adhered on the other surface of the separator film 200. After being applied with the electrode activators, the cathode plates 300 and the anode plates 400 are subjected to a heat-fusion process to attach the activators to the plates. The separator film 200 for insulating the electrodes 300 and 400 is formed of a polymeric porous film made of polyethylene(PE) or polypropylene(PP), and has a single layer structure or a multi layer structure.

On the surface of the separator film 200, there are attached the cathode plates and anode plates 300 and 400 by an ion-conductive adhesive 500 not interfering with a conductivity of lithium ion. A cell plate 100 having such a triple-layer structure of the cathode plates 300/the separator film 200/the anode plates 400 is repeatedly folded such that the anode plates 400 and the cathode plates 300 are arranged in an alternating fashion, as shown in FIG. 3.

A method of fabricating the lithium secondary cell in accordance with an embodiment of the present invention will now be described in detail with reference to FIGS. 2 and 3.

As shown in FIG. 2, a plurality of cathode plates 300 having a desired size are adhered on one surface of the separator film 200 for insulating the electrodes while being uniformly spaced apart from one another. On the other surface of the separator film 200, there are adhered a plurality of anode plates 400 having a desired size, at spaced positions corresponding to the cathode plates 300. In this way, a crude cell of a cell plate 100 is fabricated having a triple-layer structure of the cathode plates 300/the separator film 200/the anode plates 400.

Figure 3:
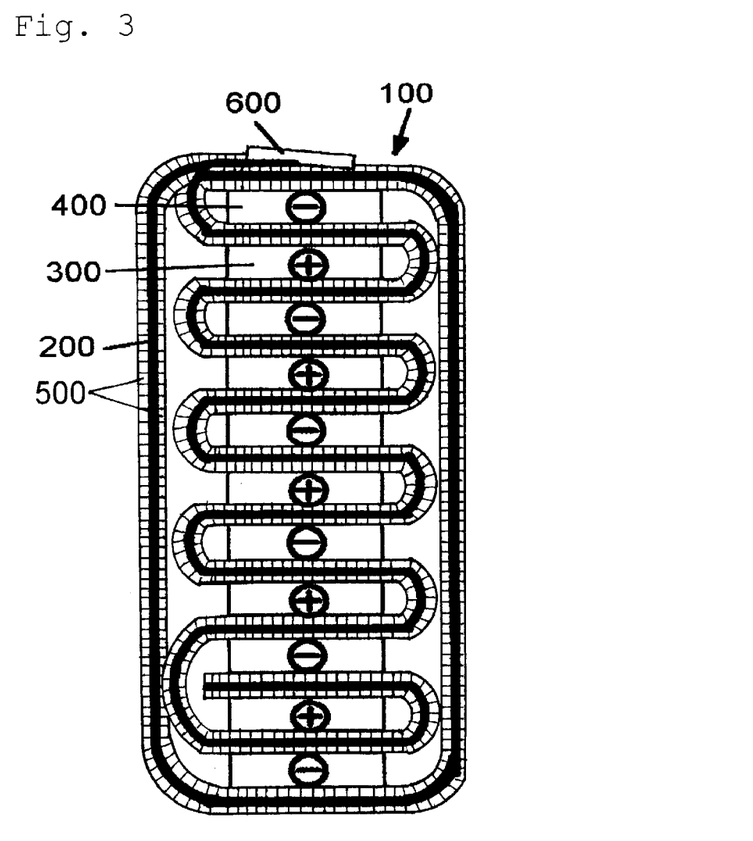
FIG. 3 is a cross-sectional view showing a folded structure of the lithium secondary cell of FIG. 2.
Figure 4:
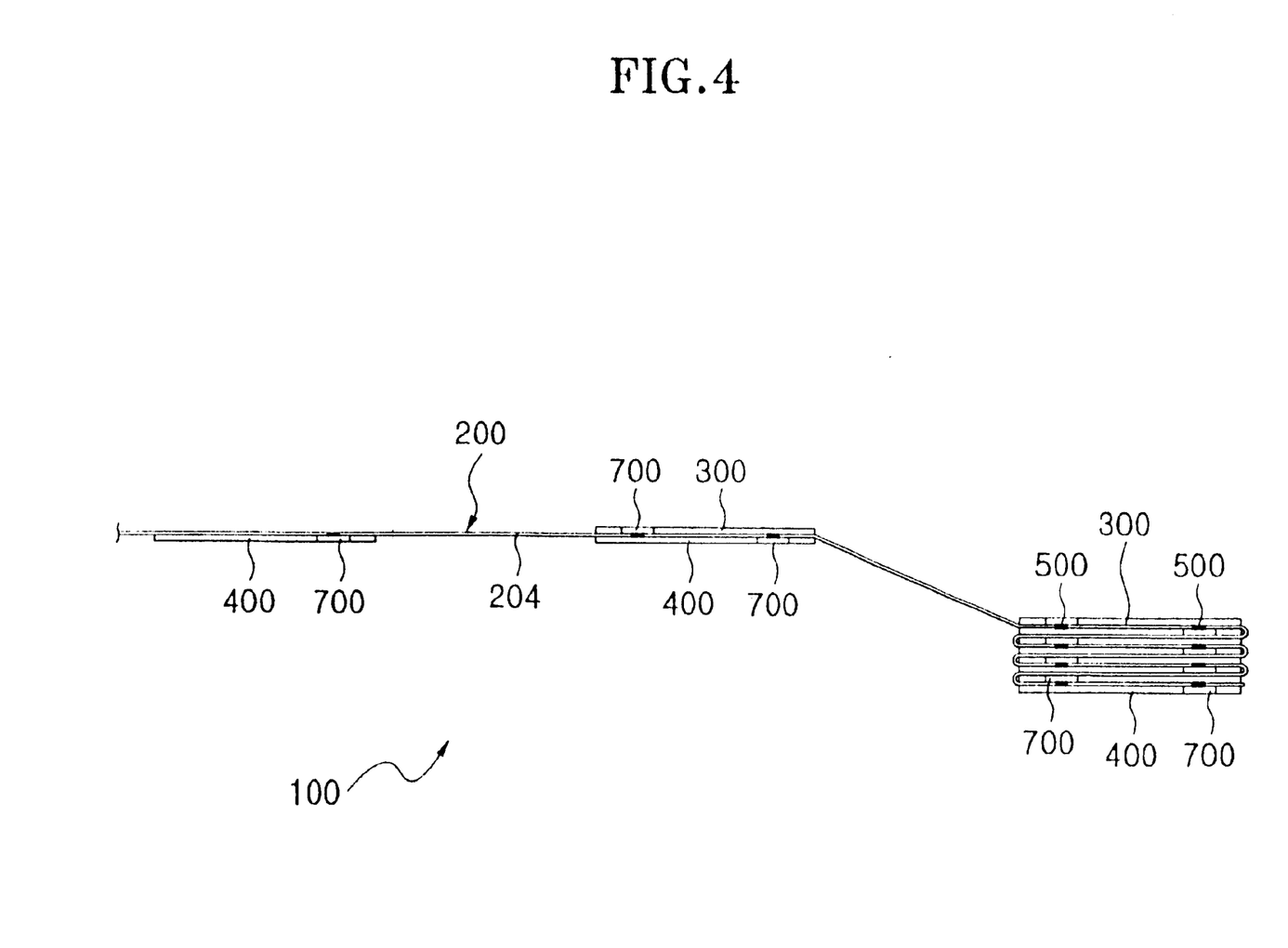
FIG. 4 is a side view of a partially folded structure of the lithium secondary cell of FIGS. 2 and 3.
Figure 5:
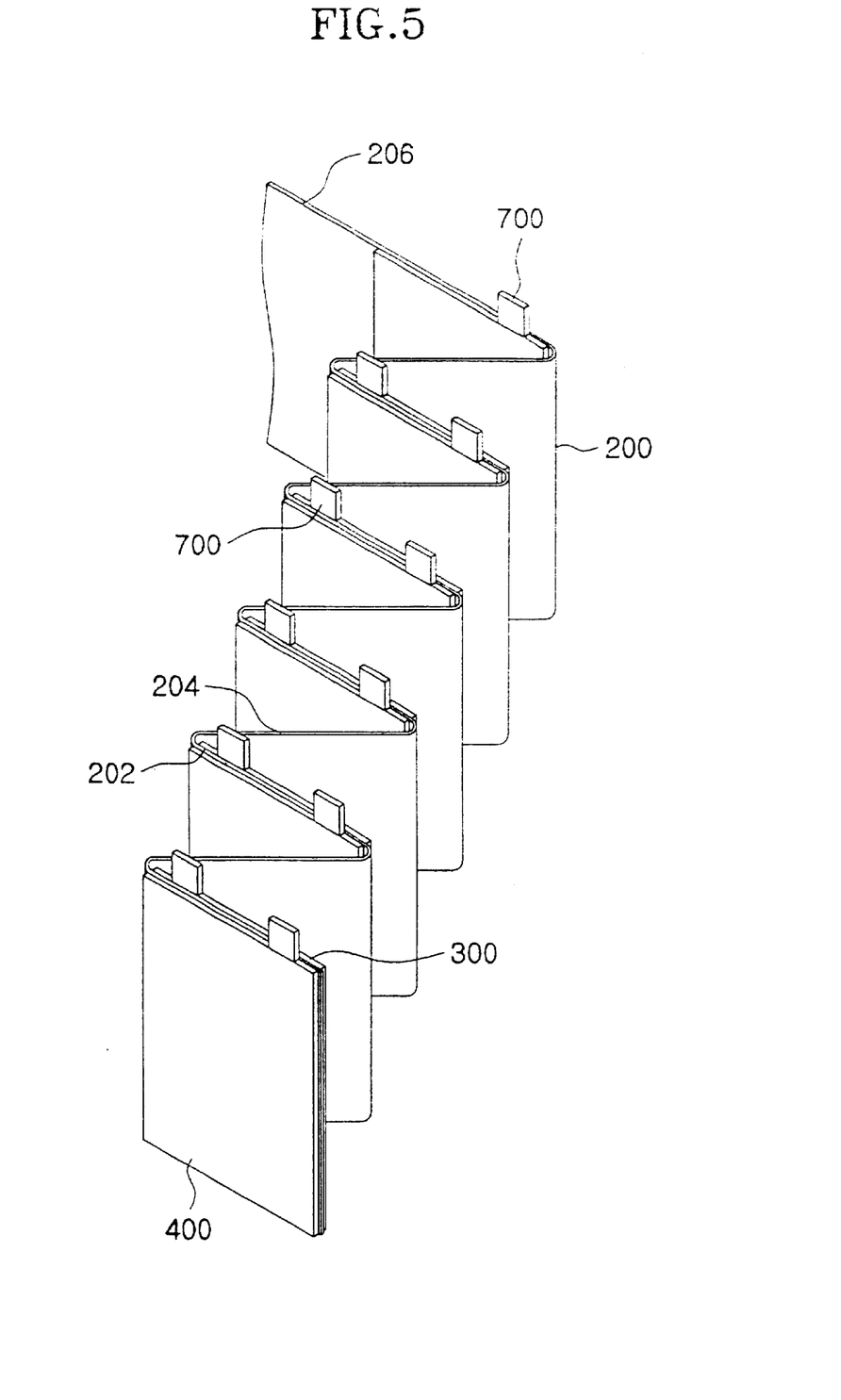
FIG. 5 is a perspective view of an unfolded structure of the lithium secondary cell of FIGS. 2 and 3.
Figure 7:
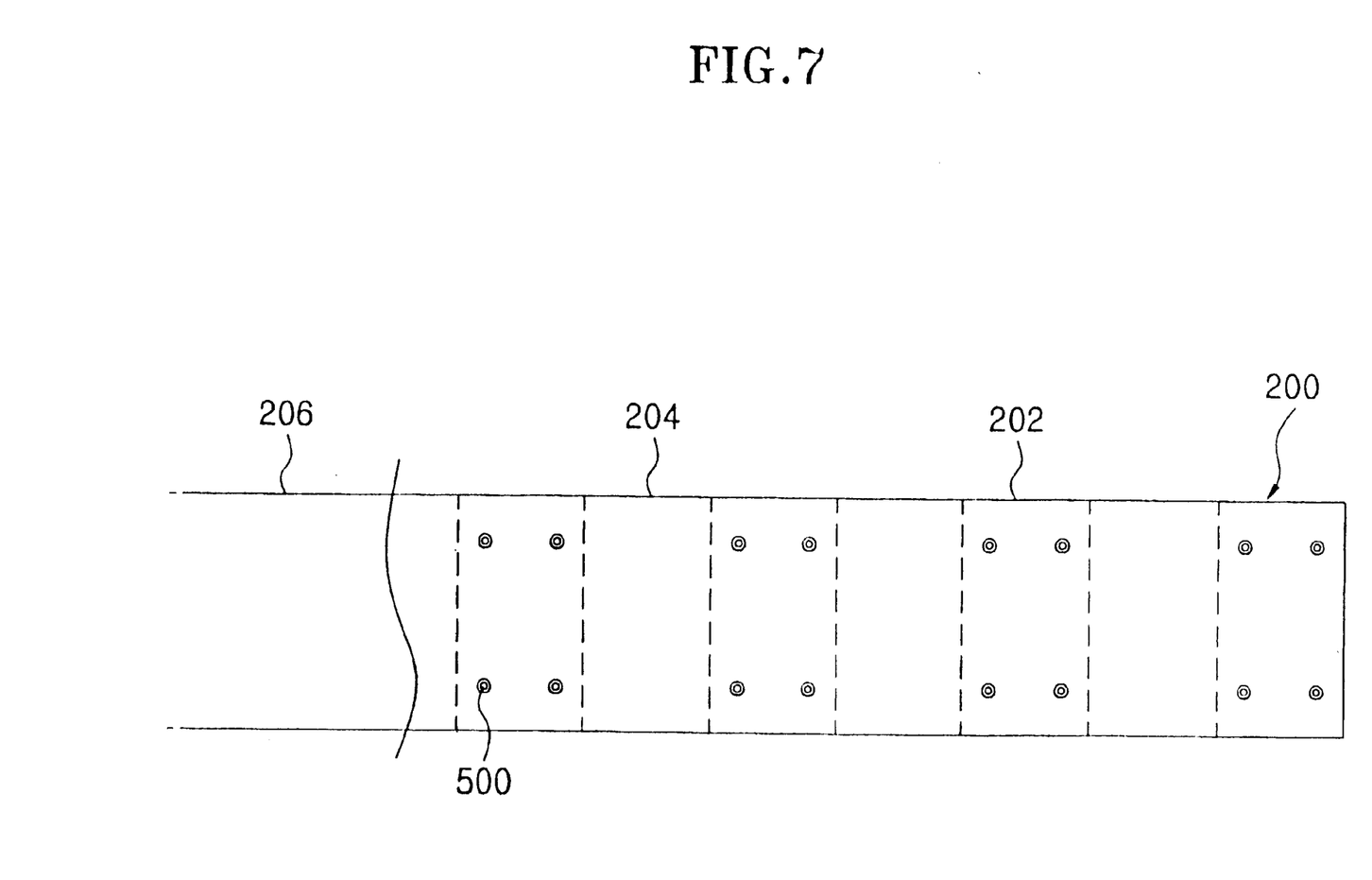
FIG. 7 is a top view of an embodiment of an unfolded structure of the lithium secondary cell of the present invention.

FIGS. 4, 5 and 7 depict partially folded and unfolded illustrations of the embodiment shown in FIG. 3. FIGS. 4 and 5 further illustrate the fold/fold feature of the present invention as shown in FIG. 3, wherein a single separator film 200 is utilized to separate the cathode plates 300 and anode plates 400 of the lithium secondary cell.

Figure 6:
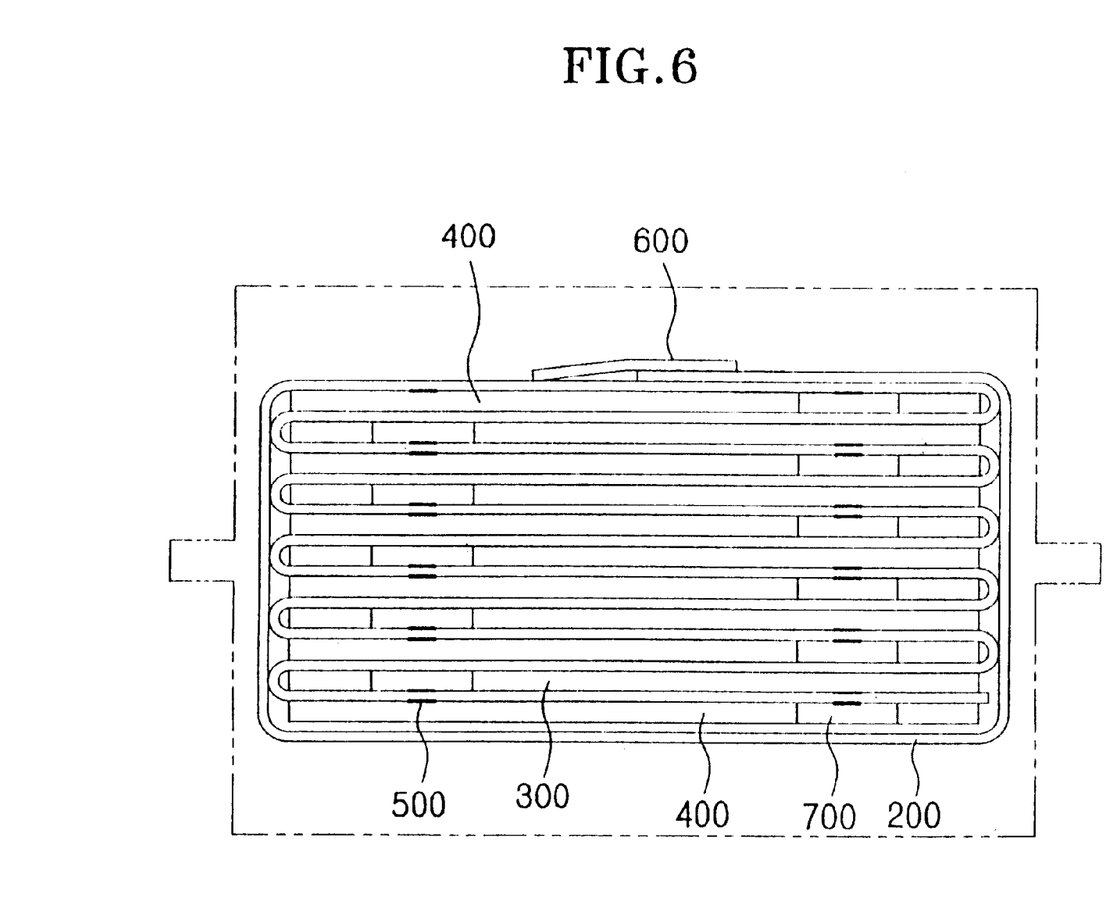
FIG. 6 is a cross-sectional view showing a folded structure of the lithium secondary cell of FIG. 2.

As previously suggested FIG. 4 and FIG. 5 depict lithium secondary cells that are in partially folded and unfolded configurations, respectively. Generally, the fold/fold feature comprises a separator 200 that includes one or more separating parts 204 and a plurality of adhering parts 202. Commonly, the cathode plates 300 are adjoined to one side of the separator film 200 at adhering parts 202 and the anode plates 400 are adjoined to the separator film 200 on the opposite side of the adhering parts 202, proximate to the corresponding cathode plates 300. A separating part 204 is positioned between each adhering part 202 and is generally of a width slightly larger than the width of one of adjacent adhering parts 204. The size or width of the separating part 204 may vary depending on the size of the plates, but normally is of sufficient size to completely cover an adjacent cathode plate 300 or anode plate 400 when the separator film is folded to the final position as depicted in FIGS. 3 and 6. The lithium secondary cell alternates folded parts of the separator film 200 by alternating with each fold of the separator film 200 a separating part 204 and an adhering part 202 to produce the fold/fold configuration. Finally, as depicted in FIGS. 3 and 6, the final folded position of the separator film 200 allows for the exposure and securement of the positive and negative electrodes 700 operably adjoined to each cathode plate 300 and anode plate 400.

In the prior art, the electrode plates 2 and 3 are heat—adhered (laminated) to the separator film 1 to fabricate the unit cell, and a plurality of the unit cells are laminated to fabricate the cell. In contrast with this, in the present invention, the electrode plates 300 and 400 are not heat-adhered to the separator film 200. In accordance with the present invention, after the cathode plates 300 and the anode plates 400 are adhered to the separator film 200, the fabricated cell plate 100 is repeatedly folded, depending on an application and size of the resulting cell, such that the anode plates 400 and the cathode plates 300 are arranged in an alternating fashion, as shown in FIG. 3. Then, the resulting cell is attached with electrode tabs 600 to produce a desired lithium secondary cell.

As apparent from the above description, the present invention provides the lithium secondary cell and the method of fabricating the same, in which the cathode plate 300 and anode plates 400 having a desired size are adhered onto the separator film 200 to form the cell plate 100 which is then repeatedly folded, such that the anode plates 400 and cathode plates 300 are arranged in an alternating fashion. Therefore, the present invention allows the lithium secondary cell to be fabricated having improved performance and particularly safety by preventing a firing caused by high current and excessive voltage charged, while having various shapes and sizes, and a desired capacity and achieving a simplified fabrication.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary cell comprising:
   a plurality of cathode plates having a desired size and adhered on one surface of a single separator film while being uniformly spaced apart from one another;
   a plurality of anode plates having a desired size and adhered on the other surface of the separator film at spaced positions corresponding to the cathode plates; and
   the separator film is repeatedly folded in a fold/fold configuration so as to be disposed between each anode plate and cathode plate such that the anode plates and the cathode plates are arranged in an alternating fashion.

2. The lithium secondary cell of claim 1, in which the separator film is formed of a polymeric single- or multi-layer film made of polyethylene or polypropylene.

3. A method of fabricating a lithium secondary cell, comprising the steps of:

applying an adhesive on a single separator film;

adhering a plurality of cathode plates having a desired size on a surface of the separator film in such a fashion that they are uniformly spaced apart from one another;

adhering a plurality of anode plates having a desired size on the other surface of the separator film in such a fashion that they are spaced apart from one another; and repeatedly folding the separator film in a fold/fold configuration so as to be disposed between each anode plate and cathode plate such that the anode plates and the cathode plates are arranged in an alternating fashion.

4. The lithium secondary cell of claim 1, in which the cathode plate comprises an aluminum foil.

5. The lithium secondary cell of claim 1, in which the anode plate comprises a copper foil.

6. The lithium secondary cell of clam 1, in which each cathode and anode plate is operably adjoined to a separate electrode.

7. The method of fabricating a lithium secondary cell of claim 3, in which the cathode plate comprises an aluminum foil.

8. The method of fabricating a lithium secondary cell of claim 3, in which the anode plate comprises a copper foil.

9. The method of fabricating a lithium secondary cell of claim 3, in which each cathode and anode plate is operably adjoined to a separate electrode.

* * * * *

UNITED STATES PATENT AND TRADEMARK OFFICE
CERTIFICATE OF CORRECTION

PATENT NO.   : 6,423,449 B1
DATED        : July 23, 2002
INVENTOR(S)  : Hong It is certified that error appears in the above-identified patent and that said Letters Patent is hereby corrected as shown below:

Column 6,
Line 3, "The lithium secondary cell of claim 1 ..." should be changed to -- The lithium secondary cell of claim 1 ... --.

Signed and Sealed this

Eighteenth Day of February, 2003

JAMES E. ROGAN
*Director of the United States Patent and Trademark Office*